United States Patent [19]

Hagihara

[11] 3,856,678

[45] Dec. 24, 1974

[54] SELF-RECONDITIONING FILTER APPARATUS FOR CONTINUOUS REMOVAL OF SOLIDS FROM A STREAM OF LIQUID

[76] Inventor: Tadashi Hagihara, 4-1, 5-chome, Minami Nagasaki, Toshima-ku, Tokyo, Japan

[22] Filed: Jan. 17, 1974

[21] Appl. No.: 434,113

[52] U.S. Cl.................... 210/160, 61/3, 198/198, 210/391
[58] Field of Search......... 61/1-4, 10, 63; 198/168,
[58] Field of Search......... 61/1, 4, 10, 63; 198/168, 198/170, 171, 172, 173, 174, 198; 210/154–161, 391, 396

[56] References Cited
UNITED STATES PATENTS

| | | | |
|---|---|---|---|
| 1,207,376 | 12/1916 | Davidson | 210/160 |
| 2,466,240 | 4/1949 | Joa | 198/198 X |
| 2,885,080 | 5/1959 | Goldman | 210/160 |
| 3,225,928 | 12/1965 | Black | 210/160 X |

FOREIGN PATENTS OR APPLICATIONS 865,726  2/1953  Germany .......................... 210/160

Primary Examiner—John Adee
Assistant Examiner—Robert H. Spitzer
Attorney, Agent, or Firm—Wenderoth, Lind & Ponack

[57] ABSTRACT

For filtration of solids from a liquid flowing through a channel of given width and depth, a filter medium is in the form of an endless belt extends over first, second and, if desired, third pairs of parallel toothed wheels mounted on first, second and third shafts respectively. The first shaft is rotatably supported across the channel close to its bottom, whereas the second and third shafts are rotatably supported across the channel above the level of the liquid flowing therethrough in coplanar relationship to each other, the second and third shafts being disposed on the downstream side of the first shaft. Drive means are provided to impart rotation to the second and third pairs of toothed wheels. The filter medium operating over the three pairs of toothed wheels is composed of a number of filter units each having a shank portion and a hook portion in offset arrangement and interconnected by transverse linking rods in such a manner that the hook portion of each filter unit is normally partly buried between the shank portions of the adjacent filter units. As the filter medium turns over the third pair of toothed wheels, the hook portions of the filter units are caused to swing outwardly thereby casting off the solids which have been caught by the filter medium as the same travels from the first to second pairs of toothed wheels.

5 Claims, 6 Drawing Figures 3,856,678

SELF-RECONDITIONING FILTER APPARATUS FOR CONTINUOUS REMOVAL OF SOLIDS FROM A STREAM OF LIQUID

BACKGROUND OF THE INVENTION

This invention relates generally to filters, and more specifically to a self-reconditioning continuous filter apparatus including a filter medium in the form of an endless moving belt for arresting, transporting and dumping of solids contained in water or other liquids flowing through a channel of given width and depth. The apparatus according to the invention is perhaps best suited for use with artificial channels through which seawater or other liquids are taken in for industrial use or through which waste industrial water or other liquids are discharged.

There have been known and used some filter apparatus incorporating filter media in the form of endless belts. However, since these known filter media are mostly formed of wire netting or other equivalent means, they are easy to be clogged up, highly deformable, not endurable, and difficult of transporting and dumping coarse or bulky matter that may be contained in the liquid to be filtered. Furthermore, such prior art filter media must usually be equipped with some extra mechanism for removal of the filter cake therefrom.

SUMMARY OF THE INVENTION

In view of the noted deficiencies of the prior art, it is an object of this invention to provide a novel and improved filter apparatus capable of continuously arresting solids of various size and nature contained in a liquid flowing through a channel of given width and depth, carrying the arrested solids away from within the flow of liquid, and succeedingly casting them off.

Another object of the invention is to provide a filter apparatus having a filter medium comprising a number of filter units arranged in the form of an endless belt, in such a fashion that the filter medium is made absolutely self-reconditioning to permit the apparatus to operate continuously for prolonged lengths of time in a substantially maintenance-free manner.

A further object of the invention is to provide a filter apparatus wherein the filter units are so shaped and arranged that the filter medium is highly nondeformable and endurable regardless of the force of a liquid flowing therethrough.

A further object of the invention is to provide a filter apparatus wherein the working length, width and mesh size of the filter medium are easily variable as required with the use of the filter units of the same shape and size.

With these objects in view and the other objects hereinafter set forth, this invention provides a self-reconditioning filter apparatus including a first pair of toothed wheels fixedly mounted adjacent both ends of a first shaft rotatably supported across a desired liquid channel adjacent its bottom. A second pair of toothed wheels are also fixedly mounted adjacent both ends of a second shaft which is rotatably supported across the liquid channel above the level of the liquid flowing therethrough and on the downstream side of the first shaft. If desired, a third pair of toothed wheels can likewise be mounted on a third shaft rotatably supported across the liquid channel further on the downstream side of the second shaft in coplanar relationship thereto. Drive means including a motor are provided to impart rotation at least to the second pair of toothed wheels.

A filter medium in the form of a flexible endless belt operates over the first, second and, if desired, third pairs of toothed wheels in engagement therewith. This filter medium comprises a number of filter units of generally flat, elongated shape each having a shank portion and a hook portion in offset arrangement, and a plurality of linking rods arranged transversely of the filter medium to interconnect the filter units into the form of the endless belt with desired lateral spacings between the adjacent filter units. The filter units are interconnected in such a manner that the hook portion of each unit is normally partly buried between the shank portions of the transversely adjacent filter units. Thus, as the filter medium turns over the second, or third, pair of toothed wheels at an acute angle, the hook portions of the filter units are caused to swing outwardly from between the shank portions of the adjacent filter units and hence to cast off the solids which have been arrested by the filter medium as the same travels from the first to second pairs of toothed wheels.

The features which are believed to be novel and characteristic of this invention are set forth with particularity in the appended claims. The invention itself, however, both as to its organization and mode of operation, together with the further objects and advantages thereof, will be best understood from the following description of some preferred embodiments taken in connection with the accompanying drawings wherein like reference characters denote like parts of the several views.

DESCRIPTION OF THE PREFERRED EMBODIMENTS

Figure 1:
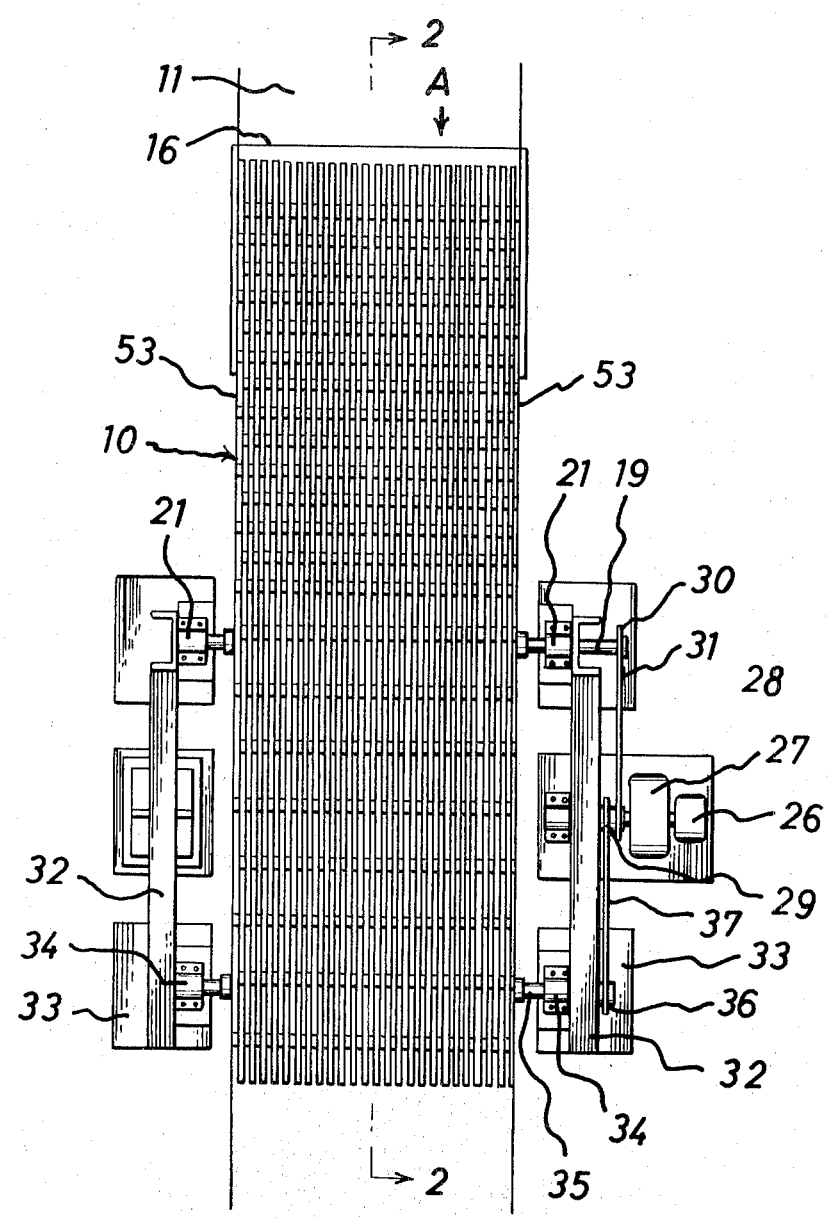
FIG. 1 is a top plan view of a filter apparatus constructed in accordance with the novel concepts of this invention.

The invention will now be described more specifically in terms of a first preferred embodiment thereof illustrated in FIGS. 1 to 4. As will be seen from both FIGS. 1 and 2, the invention is perhaps best characterized by the use of a filter medium 10 in the form of an endless moving belt adapted for continuous filtration of solids from water or like liquid flowing through a channel 11 of known width and depth in the direction of the arrows A in the drawings. As best seen in FIG. 2, the filter medium 10 in this particular embodiment of the invention operates over first, second and third pairs of parallel spaced toothed wheels 12, 13 and 14.

The first pair of toothed wheels 12 are idlers fixedly mounted adjacent both ends of a first shaft 15 which is rotatably supported by a base 16 installed at the bottom of the water channel 11 in a transverse direction thereof. Although not clearly seen in the drawings, the base 16 consists essentially of a pair of rectangular side walls 17 interconnected through a substantially flat bottom 18, the side walls 17 rotatably supporting the aforesaid first shaft 15 at both ends thereof.

The second pair of toothed wheels 13 are fixedly mounted adjacent both ends of a second shaft 19 which is rotatably supported across the water channel 11 above the level of the water flowing therethrough and on the downstream side of the first shaft 15. For thus supporting the second shaft 19, a first pair of columns 20 are installed uprightly on both banks of the water channel 11, and a pair of bearings 21 of any suitable type are mounted on the tops of the respective columns 20 to rotatably support the second shaft 19.

It will be seen from FIG. 2 that a frame 22 extends linearly between the first and second pairs of toothed wheels 12 and 13 to support the filter medium 10 against the force of the water flowing therethrough as the filter medium moves from the first to the second pair of toothed wheels in sliding contact with the frame. This frame 22 is rigidly coupled at its lower end to a sleeve 23 loosely fitted over the first shaft 15 between the first pair of toothed wheels 12 and at its upper end to another sleeve 24 similarly loosely fitted over the second shaft 19 between the second pair of toothed wheels 13.

A second pair of columns 25 are installed uprightly on the respective banks of the water channel 11 on the downstream side of the first pair of columns 20. One of these columns 25 supports on its top a drive mechanism adapted to impart rotation to the second and third pairs of toothed wheels 13 and 14 and hence to cause the filter medium 10 to move over the first, second and third pairs of toothed wheels as above stated. The drive mechanism comprises a motor 26 and a speed reduction unit 27, the latter being coupled directly to the output shaft of the former. Sprocket wheels 28 and 29 are fixedly mounted on the output shaft of the speed reduction unit 27, and the sprocket wheel 28 is operatively coupled to an additional sprocket wheel 30 fixedly mounted on one end of the second shaft 19 via an endless chain 31.

Figure 2:
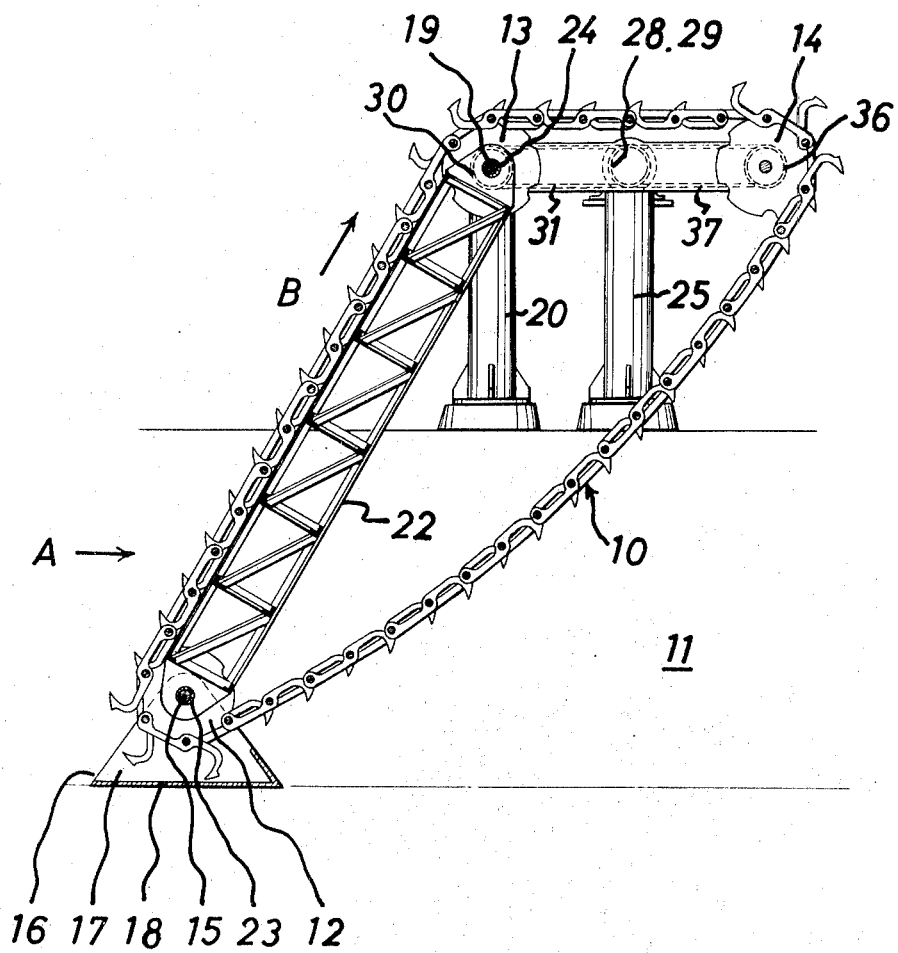
FIG. 2 is a vertical sectional view of the apparatus of FIG. 1, taken along the plane of line 2—2 in FIG. 1 and looking in the direction of the arrows.

As seen in FIG. 1, a pair of horizontally extending brackets 32 are each securely supported on the tops of the columns 20 and 25 on each bank of the water channel 11. These brackets 32 are adapted to support rectangular mounting plates 33 on the downstream side of the second pair of columns 25. The mounting plates 33 carry a pair of bearings 34 thereon rotatably supporting a third shaft 35 across the water channel 11 in coplanar relationship to the second shaft 19.

The aforesaid third pair of toothed wheels 14 are fixedly mounted on this third shaft 35 adjacent both ends thereof. A sprocket wheel 36 is further fixedly mounted on one end of the third shaft 35, and an endless chain 37 extends between this sprocket wheel 35 and the sprocket wheel 29 fixedly mounted on the output shaft of the speed reduction unit 27. It will now be apparent that the filter medium 10 is caused to move in the direction of the arrow B, FIG. 2, over the first, second and third pairs of toothed wheels 12, 13 and 14 as the motor 26 is set in motion to impart rotation to the second and third pairs of toothed wheels via the speed reduction unit 27, the respective endless chains 31 and 37, and the second and third shafts 19 and 35 respectively.

Figure 3:
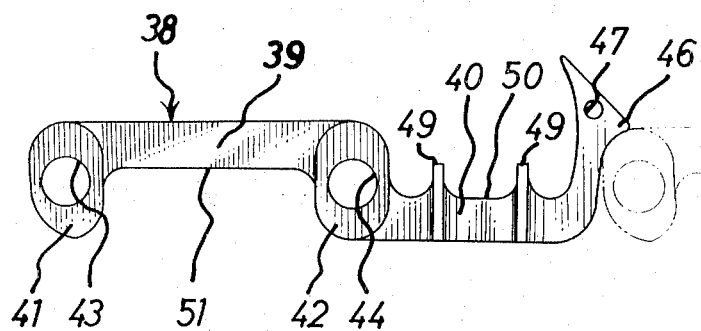
FIG. 3 is an enlarged side elevational view of one of filter units constituting a filter medium in the apparatus of FIGS. 1 and 2.
Figure 4:
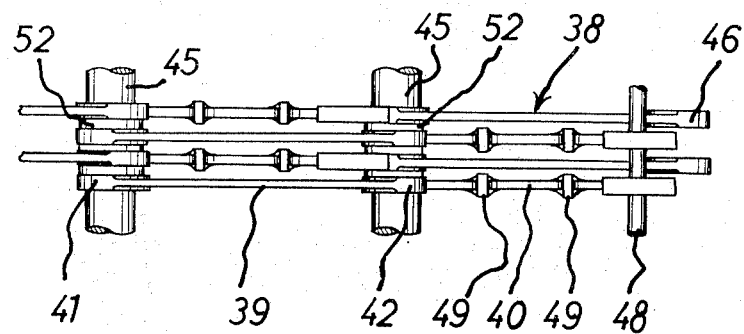
FIG. 4 is an enlarged partial top plan view of the filter medium in the apparatus of FIGS. 1 and 2.

The filter medium 10 in the form of an endless belt is composed essentially of a number of filter units 38 of generally flat, elongated shape which are arranged longitudinally of the endless belt, as illustrated on an enlarged scale in FIGS. 3 and 4. These filter units 38 may be formed of stainless steel, unplasticized polyvinyl chloride, or similarly rigid material depending principally upon the particular application for which the filter apparatus is to be employed. As seen in FIGS. 3 and 4, each of the filter units 38 includes a shank portion 39 and a hook portion 40 of approximately equal length which are formed integral with each other in offset arrangement. The shank portion 39 has substantially elliptical expansions 41 and 42 on both ends thereof through which are formed transverse bores 43 and 44 respectively. These bores 43 and 44 are adapted to receive linking rods 45 therethrough for assemblage of a number of such filter units 38 into the form of the endless belt shown in FIGS. 1 and 2, as hereinafter explained in more detail.

The hook portion 40 of each filter unit 38 has its end away from the shank portion 39 bent outwardly with respect to the overall filter medium 10 as indicated by the numeral 46 in FIG. 3, and a bore 47 of smaller diameter than the bores 43 and 44 is formed transversely through the bent end 46 of the hook portion 40 to receive a reinforcing rod 48 therethrough. The hook portion 40 is adapted principally to hold securely the filtered solids as the filter medium 10 is caused to move in the direction of the arrow B in FIG. 2. To this end there can be further provided one or more, two in this embodiment, ridges 49 on the outer edge 50 of the unbent or major part of the hook portion 40. It is to be noted that as best shown in FIGS. 2 and 3, there exists some clearance between the outer edge 50 of the hook portion 40 of each filter unit and the inner edge 51 of the shank portion 39 of an adjacent filter unit.

For fabricating the complete filter medium 10 shown in FIGS. 1 and 2, a number of filter units 38 of the above described configuration are longitudinally linked together into the form of a flexible endless belt by means of the linking rods 45 turnably inserted into the transversely aligned bores 43 and 44 of the filter units. As will be seen from FIG. 4 in particular, each linking rod 45 is inserted alternately into the bores 43 and 44 of the adjacent filter units, with any desired lateral spacings or meshes therebetween formed by the provision of annular spacers 52 which are fitted over the linking rods. It will therefore be understood that the hook portion 40 of each filter unit 38 is normally deeply buried between the shank portions 39 of the transversely adjacent filter units except for its outwardly bent end 46 which projects a suitable distance from the general surface of the filter medium 10. This arrangement is particularly important to prevent deformation of the hook portions 39 and further of the entire filter medium 10 during operation of the apparatus.

Both sides of the endless belt thus formed by the filter units 38 are covered by a plurality of side plates 53 each of which approximately corresponds in length to that of the shank portion 39 of each filter unit and in width to the thickness of the filter medium 10 and which are interconnected in alternately overlapping and underlapping relationship by both ends of the linking rods 45 so as to be turnable relative to each other. The reinforcing rods 48 are further securely received in the transversely aligned bores 47 in the outwardly bent ends 46 of the respective filter units 38 for added strength, although these reinforcing rods may be dispensed with if the intended application of the apparatus does not call for them. It will be apparent that the width of the filter medium 10 is easily adjustable to the exact width of the water channel 11, and its overall length also easily variable as required, by use of the filter units 38 of the same size and configuration.

In the operation of the continuous filter apparatus constructed as hereinbefore described and installed in the water channel 11 as shown in FIGS. 1 and 2, the motor 26 is first set in motion to cause the filter medium 10 to move in the direction of the arrow B, FIG. 2, over the first, second and third pairs of toothed wheels 12, 13 and 14. The teeth on these wheels, with a pitch corresponding to the length of the shank portion 39 of each filter unit 38, are adapted to engage the meshes of the filter medium 10 adjacent both sides thereof, so that the rotation imparted to the second and third pairs of toothed wheels 13 and 14 by the motor 26 results in the endless turning motion of the filter medium over the three pairs of toothed wheels.

All the solids larger than the meshes of the filter medium 10 are thereby caught as they move downstream in suspension in the water flowing through the water channel 11, and even those solids flowing over the bottom of the water channel can be scraped up by the hook portions 40 of the filter units 38 turning over the first pair of toothed wheels 12, as will be seen from FIG. 2. The solids thus arrested by the filter medium 10 are thereby conveyed upwardly to the second pair of toothed wheels 13 and then horizontally to the third pair of toothed wheels 14. Then, as the transversely aligned filter units 38 of the filter medium 10 start turning over the third pair of toothed wheels 14 at an acute angle, their hook portions 40 become gradually turned outwardly from within the spacings between the shank portions 39 of the transversely adjacent filter units. The solids which have been caught on the filter medium 10 are thus dislodged therefrom and perhaps fall by gravity down into a suitable receptacle, not shown, placed under the third pair of toothed wheels 14 across the water channel 11. It will be apparent that the thus reconditioned part of the filter medium 10 travels down to the first pair of toothed wheels 12 to repeat the above described cycle of operation.

Figures 5, 6:
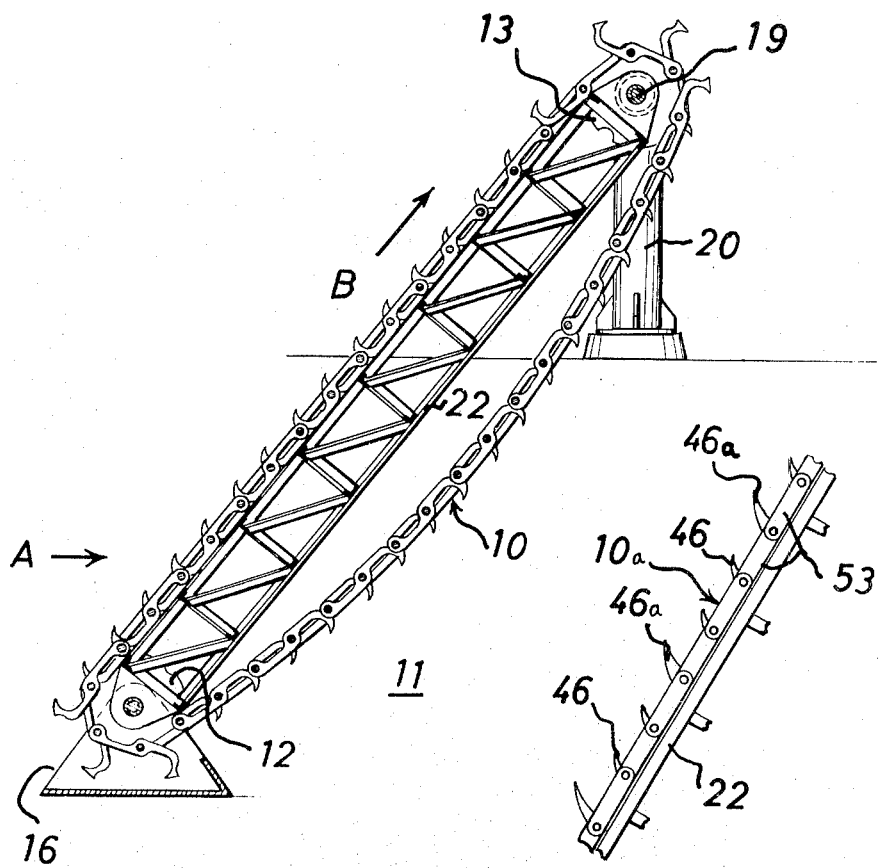
FIG. 5 is a view corresponding to FIG. 2 but showing another preferred embodiment of the invention.
FIG. 6 is an enlarged fragmentary side elevational view showing a modified example of the filter medium in the apparatus of FIGS. 1 and 2 or of FIG. 5.

FIG. 5 illustrates another preferred embodiment of the invention, in which the filter medium 10 constructed exactly as above stated in connection with the FIGS. 1 to 4 embodiment is adapted to move endlessly over the first and second pairs of toothed wheels 12 and 13 only. Although not seen in the drawing, it is assumed that the aforesaid drive mechanism shown in FIG. 1 is mounted directly upon the top of one of the columns 20, with the output shaft of the speed reduction unit 27 coupled directly to the second shaft 19 to impart rotation to the second pair of toothed wheels 13 fixedly mounted on the latter. Other details of construction and operation will be apparent from the foregoing description of the FIGS. 1 to 4 embodiment.

Illustrated in FIG. 6 is a modification of either of the preceding two embodiments of the invention, in which the filter medium 10a is composed of the regular filter units shown in FIGS. 3 and 4 and others the hook portions of which have their bent ends 46a considerably more elongated than those of the regular filter units. By suitably combining these two types of filter units, even highly coarse or bulky solids can be successfully arrested and conveyed to the second or third pair of toothed wheels, without substantially sacrificing the above noted advantages of the present invention.

Thus, while it will be apparent that the preferred embodiments of the invention herein disclosed are well calculated to fulfill the objects above stated, it will be appreciated that the invention itself is susceptible to many modifications, substitutions or changes within the usual knowledge of those skilled in the art, and in some instances some features of the invention may be employed without the corresponding use of other features. It is therefore appropriate that the invention be construed broadly and in a manner consistent with the spirit and scope of the invention as sought to be defined by the appended claims.

I claim:

1. A self-reconditioning filter apparatus for continuous removal of solids from a liquid flowing through a channel of given width and depth, comprising in combination:

a shaft rotatably supported across said channel adjacent the bottom thereof;

a first pair of toothed wheels fixedly mounted on said shaft adjacent both ends thereof respectively;

at least one other shaft rotatably supported across said channel above the level of the liquid flowing therethrough, said one other shaft being located on the downstream side of the first mentioned shaft;

a second pair of toothed wheels fixedly mounted on said one other shaft adjacent both ends thereof respectively;

drive means for imparting rotation at least to said second pair of toothed wheels;

a filter medium in the form of an endless belt adapted to operate at least over said first and second pairs of toothed wheels in engagement therewith, said filter medium including:

a number of filter units of generally flat, elongated shape arranged longitudinally of said filter medium in a discontinuous manner with lateral spacings therebetween and each having a shank portion and a hook portion in offset arrangement, said shank portion having first and second bores formed through both ends thereof respectively; and a plurality of linking rods arranged transversely of said filter medium to interconnect said filter units into the form of an endless belt, each of said linking rods being loosely received alternately in said first and second bores of the adjacent filter units whereby the hook portion of each of said filter units is normally partly buried between the shank portions of the transversely adjacent filter units; and a frame extending linearly between said first and second pairs of toothed wheels to support said filter medium against the force of the liquid flowing therethrough.

2. The apparatus as recited in claim 1, wherein said hook portion of each of said filter units has its end away from said shank portion bent substantially at a right angle, said bent end of said hook portion projecting outwardly of said filter medium in order to hold the solids arrested by said filter medium.

3. The apparatus as recited in claim 2, wherein said bent ends of said hook portions of said filter units have bores formed respectively therethrough in transverse alignment with respect to said filter medium, and wherein said apparatus further includes a plurality of reinforcing rods securely received in the respective transversely aligned bores of said bent ends of said hook portions.

4. The apparatus as recited in claim 2, wherein said hook portion of each of said filter units has at least one ridge formed on one edge thereof which is directed outwardly of said filter medium, said ridges on said hook portions being adapted to ensure the secure holding of the solids arrested by said filter medium.

5. A self-reconditioning filter apparatus for continuous removal of solids from a liquid flowing through a channel of given width and depth, comprising in combination:

a first shaft rotatably supported across said channel adjacent the bottom thereof;

a first pair of toothed wheels fixedly mounted on said first shaft adjacent both ends thereof respectively;

a second shaft rotatably supported across said channel above the level of the liquid flowing therethrough, said second shaft being located on the downstream side of said first shaft;

a second pair of toothed wheels fixedly mounted on said second shaft adjacent both ends thereof respectively;

a third shaft rotatably supported across said channel substantially in coplanar relationship to said second shaft, said third shaft being located further on the downstream side of said second shaft;

a third pair of toothed wheels fixedly mounted on said third shaft adjacent both ends thereof respectively;

drive means for imparting rotation to said second and third pairs of toothed wheels;

a filter medium in the form of an endless belt adapted to operate over said first, second and third pairs of toothed wheels in engagement therewith, said filter medium including:

a number of filter units of generally flat, elongated shape arranged longitudinally of said filter medium in a discontinuous manner with lateral spacings therebetween and each having a shank portion and a hook portion in offset arrangement, said shank portion having first and second bores formed through both ends thereof respectively; and a plurality of linking rods arranged transversely of said filter medium to interconnect said filter units into the form of an endless belt, each of said linking rods being loosely received alternately in said first and second bores of the adjacent filter units whereby the hook portion of said filter units is normally partly buried between the shank portions of the transversely adjacent filter units; and a frame extending linearly between said first and second pairs of toothed wheels to support said filter medium against the force of the liquid flowing therethrough.

* * * * *